Figure 2A:
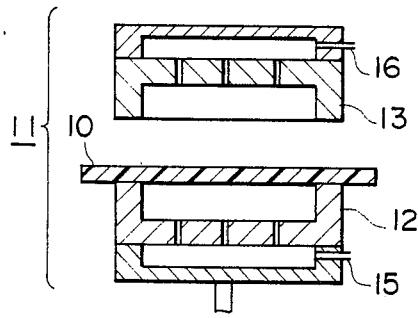

United States Patent [19]
Akiyama et al.

[11] Patent Number: 4,806,293
[45] Date of Patent: Feb. 21, 1989

[54] METHOD OF PRODUCING A FOAMED, MOLDED ARTICLE

[75] Inventors: Hiroyuki Akiyama, Hiratsuka; Yoshimi Sudo, Chigasaki; Masahiko Kishida; Mitsuru Nishida, both of Hiratsuka, all of Japan

[73] Assignee: Japan Styrene Paper Corporation, Tokyo, Japan

[21] Appl. No.: 37,172

[22] Filed: Apr. 10, 1987

[30] Foreign Application Priority Data

Apr. 15, 1986 [JP] Japan .................. 61-86730

[51] Int. Cl.$^4$ .................................................. B29C 67/22
[52] U.S. Cl. .................................. 264/53; 264/51; 264/55
[58] Field of Search ............... 264/45.5, 46.1, 55, 264/321, 323, 51, 53

[56] References Cited

U.S. PATENT DOCUMENTS

| | | | |
|---|---|---|---|
| 3,268,636 | 8/1966 | Angell | 264/45.5 |
| 3,812,225 | 5/1974 | Hosoda et al. | 264/321 |
| 4,323,528 | 4/1982 | Collins | 264/53 |
| 4,397,797 | 8/1983 | Nojiri et al. | 264/45.5 |
| 4,456,571 | 6/1984 | Johnson | 264/45.5 |
| 4,524,037 | 6/1985 | Marc | 264/321 |

Primary Examiner—Jan H. Silbaugh
Assistant Examiner—Allan R. Kuhns
Attorney, Agent, or Firm—Stephen F. K. Yee

[57] ABSTRACT

Method of producing a molded article of a foamed thermoplastic resin. A molten mass of an expandable thermoplastic resin is accumulated in an accumulator while it is prevented from foaming. A predetermined quantity of the accumulated thermoplastic resin is ejected rapidly from the accumulator into the atmosphere so that the thermoplastic resin commences foaming. The ejected thermoplastic resin is placed in a mold cavity before the foaming expansion has been completed and is compressed. The expansion and molding of the ejected thermoplastic resin is completed in the mold while controlling the compression pressure to obtain a foamed molded article.

5 Claims, 4 Drawing Sheets

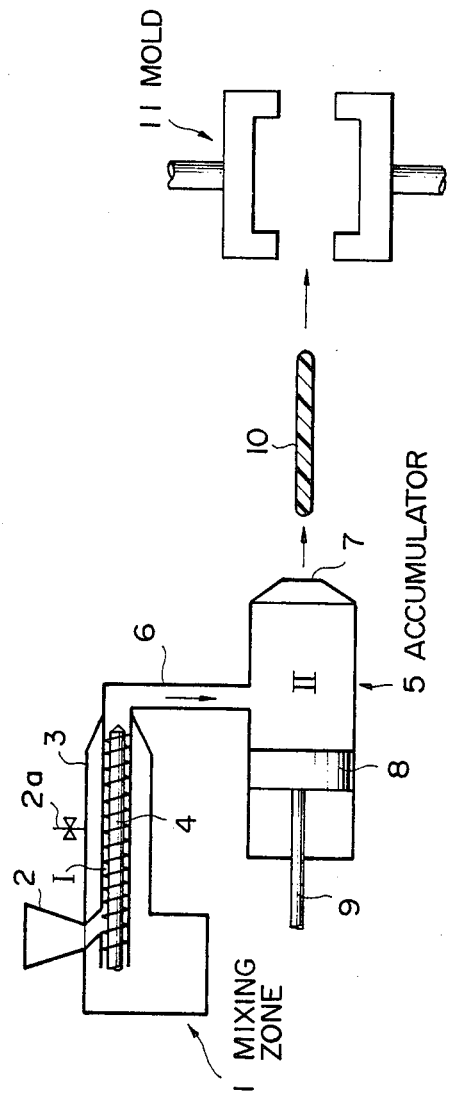

METHOD OF PRODUCING A FOAMED, MOLDED ARTICLE

This invention relates to a method of producing a foamed, molded article formed of a thermoplastic resin.

For the production of foamed, molded article of a thermoplastic resin, there are known a bead molding method, an injection molding method and an extrusion molding method. The bead molding method is a method in which pre-foamed particles filled in a mold cavity are heated for further expansion and fuse-bonding thereof in the mold. Thus, the bead molding method is disadvantageous because it requires two expansion steps and traces or marks of the beads are left in the resulting molded article. Additionally, when a polyolefin resin is used as the raw material, it is difficult to obtain molded articles with a low expansion ratio. Moreover, moderately expanded polyolefin molded articles obtained by a bead molding method are poor in both bending strength and compression strength because of incomplete fuse-bonding between the particles.

The injection molding method is a method in which a molten mass of a foamable resin is injected into a mold cavity and the injected resin is allowed to expand in the mold. This method, however, requires a high injection pressure and, hence, a large and strong apparatus to withstand the pressure. Moreover, the injection molding method has a defect that it can only provide an expansion ratio of at most about 2.

The extrusion molding method in which a molten, expandable resin is extruded through a die may be used only for the purpose of producing foamed artcles of a simple shape such as sheet- or rod-like products.

Japanese Published, Unexamined Patent Application (Tokkyo Kōkai) No. 58-119832 discloses a method in which a molten mass of an expandable resin is extruded, using an ordinary extruder, into one of the mold sections and, after the expansion of the extruded resin is almost complete the other mold section is closed to forcibly contract the expanded resin. The molded product obtained, however, has a low compression strength in the direction along which the resin was contracted during the mold closing step.

The present invention has been made with the consideration of the foregoing problems of the prior art techniques. In accordance with the present invention there is provided a method of producing a foamed molded article, comprising the steps of:

(a) accumulating in an accumulator a molten mass of an expandable thermoplastic resin while maintaining said molten mass at a temperature and a pressure so that said molten mass is prevented from foaming;

(b) ejecting a predetermined quantity of the accumulated thermoplastic resin rapidly from said accumulator into an atmosphere maintained at a pressure lower than that within said accumulator so that the ejected thermoplastic resin commences foaming;

(c) placing the ejected thermoplastic resin in a mold cavity before the expansion thereof has been completed; and (d) compressing the thermoplastic resin in the mold cavity; and (e) completing the expansion and molding of the ejected thermoplastic resin in the mold while controlling the compression pressure to obtain a foamed molded article.

Any knnown thermoplastic resin may be used as a raw material in the process of the present invention. Illustrative of suitable thermoplastic resins are polyolefin resins such as polyethylenes, polypropylenes, copolymers of ethylene and a mono-olefin (e.g. propylene), copolymers of ethylene and a vinyl monomer (e.g. vinyl acetate), and resins obtained by modifying the above polymers or copolymers with a silane compound; styrene resins such as polystyrenes and ABS resins; polyvinyl chloride resins; polyamide resins; polycarbonate resins; and polyhydroxy ether resins. The method of the present invention is particularly suited for the production of foamed articles formed of polyethylenes such as high density polyethylene and polypropylene.

The thermoplastic resin exemplified above is homogeneously commingled with a blowing agent at a temperature higher than the melting point of the resin under a pressurized condition to obtain a molten, expandable thermoplastic resin composition. Both decomposition-type blowing agents and solvent-type blowing agents may be used for the purpose of the present invention. However, the use of the solvent-type blowing agents is recommended. Examples of the solvent-type blowing agents include cycloparaffins such as cyclobutane and cyclopentane; aliphatic hydrocarbons such as propane, butane, pentane, hexane and heptane; and halogenated hydrocarbons such as trichlorofluoromethane, dichlorodifluoromethane, methyl chloride, methylene chloride, dichlorotetrafluoroethane, tetrafluoroethane, tetrafluorochloroethane, trifluorochloroethane, pentafluoroethane, trifluoroethane, difluorochlroethane, ethyl chloride, trifluoropropane, difluoropropane and octafluoropropane.

The molten, expandable resin composition may further contain a conventional expansion aid such as a metal salt or metal hydrogen salt of an organic acid, a metal salt or metal hydrogen salt of carbonic acid, or talc.

Figure 2B:
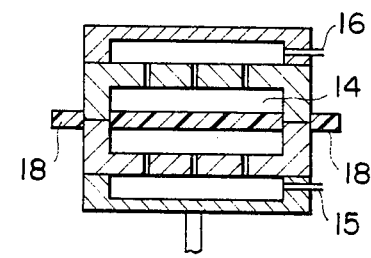
Figure 2C:
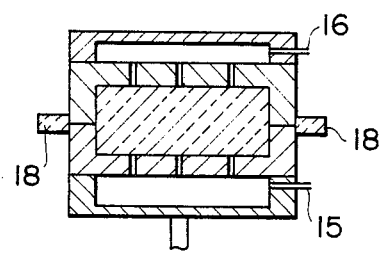
Figure 2D:
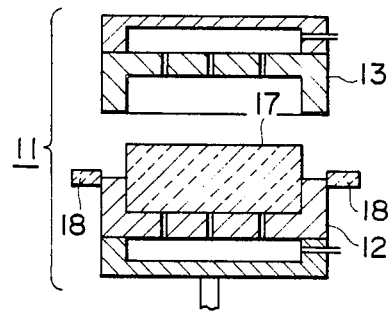
Figure 3A:
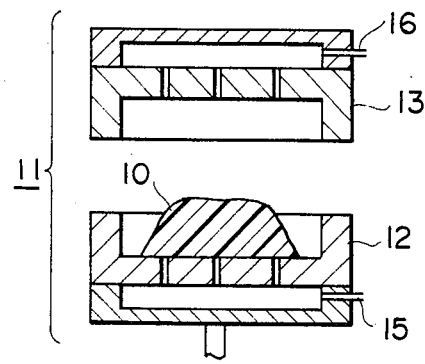
Figure 3B:
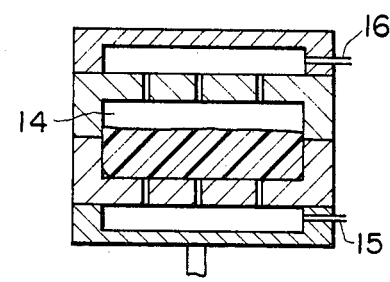
Figure 3C:
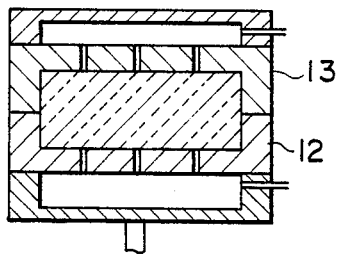
Figure 3D:
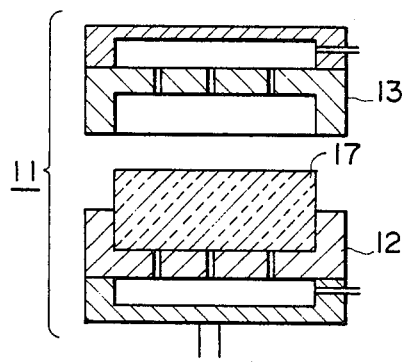
Figure 4A:
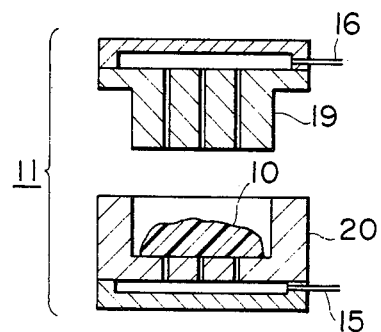
Figure 4B:
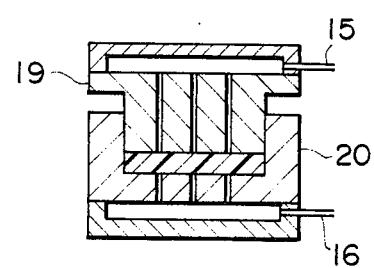
Figure 4C:
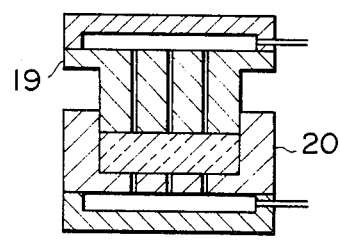
Figure 4D:
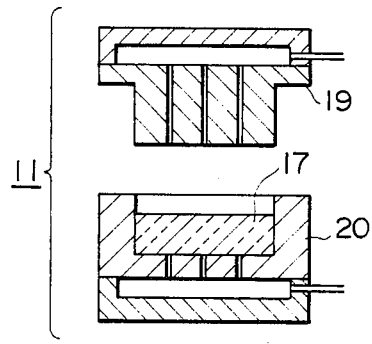

The present invention will now be described in more detail with reference to the accompanying drawings, in which:

FIG. 1 is a flow diagram of the apparatus suitable for carrying out the method of the present invention;

FIGS. 2(a) through 2(d) are vertical cross-sections schematically showing one embodiment of molding step according to the present invention; and FIGS. 3(a) through 3(d) and 4(a) through 4(d) are vertical cross-sections, similar to FIGS. 2(a)–2(d), showing further embodiments of molding step according to the present invention.

Designated generally as 1 is a mixing zone where raw materials such as thermoplastic resin pellets and, optionally, an expansion aid introduced from a hopper 2 are commingled with a blowing agent supplied through a line 2a at a temperature higher than the melting point of the thermoplastic resin and under a pressure to obtain a molten, expandable resin. Customarily employed temperature and the pressure, which are generally determined according to the resin used, are adopted in the present invention. In the case of high density polyethylene or polypropylene, for example, a temperature of 120°–200° C. and a pressure of 30–200 kg/cm$^2$G are used. The mixing is generally effected by means of an extruder 3 provided with an auger 4.

The molten, expandable resin composition thus prepared in the mixing zone 1 is fed to an accumulator 5 through a passage 6 and accumulated therein. During the accumulation of the molten resin, the inside of the accumulator is maintained at a temperature and a pressure under which no expansion thereof is caused. Generally, the molten resin is maintained at a temperature lower than that in the mixing zone 1. For example, when a high density polyethylene is used, the accumulator is preferably maintained at a temperature of 120°–150° C. and a pressure of 30–200 kg/cm²G.

When the molten expandable resin is accumulated in the accumulator 5 in a predetermined amount, it is discharged from the accumulator 5 through a die 7 rapidly into an atmosphere maintained at a pressure lower than that in the accumulator 5, generally ambient pressure, so that the discharged molten resin 10 commences expanding. The rate at which the molten resin is accumulated in the accumulator and is discharged therefrom is preferably 250 kg/hr or more. To expedite the discharge of the molten resin, it is preferable to use a means for forcibly discharging the molten resin. Thus, in the embodiment shown in FIG. 1, the accumulator 5 has a cylindrical shape and is provided with a gate (not shown) for opening and closing the aperture of the die 7 and with a ram 8 reciprocally slidably disposed therewithin. The ram 8 is secured to a piston rod 9 of a hydraulic means (not shown).

The ram 8 is operated in the following manner. The molten resin prepared in the mixing zone 1 is introduced under a pressure into the accumulator 5 through the passage 6 while closing the aperture of the die 7 with the gate. The pressure is transmitted to the ram 8 so that the arm 8 is gradually slid as the molten resin is accumulated within the accumulator 5. When the molten resin accumulated in the accumulator 5 reaches a predetermined volume, the hydraulic means is actuated and, simultaneously, the gate is opened. Thus, the piston rod 9 is driven to advance the ram 8 toward the die 7, thereby ejecting the accumulated molten resin through the die 7 into the atmosphere. Thereafter, the gate is closed and the pressure of the hydraulic means is released so as to decrease the pressing force of the ram 8 to a predetermined level. As a result, the molten resin in the mixing zone 1 is again introduced into the accumulator 5 and is accumulated therein. In like manner, molten resin is intermittently discharged from the accumulator 5. The pressure inside the accumulator 5 is controlled to a range so that the foaming of the molten resin is prevented. This can be performed by controlling the pressure exerted by the hydraulic means and applied to the ram 8.

A preferred example of the accumulator as described above is disclosed in U.S. Pat. No. 4,323,528, the disclosure of which is hereby incorporated by reference.

The molten resin 10 thus discharged from the accumulator 5 is placed into the mold cavity of a mold 11 before the expansion thereof is completed and is subjected to expansion-molding conditions therewithin to obtain an expanded, molded article. Preferably, the expansion-molding is started before the degree of expansion of the molten resin reaches 50%, more preferably 30%. The resulting molded article generally has an expansion ratio of 1.2–50, particularly 2–10. The shape of cells of the molded article is generally spherical or elliptic with their major axes oriented in the direction along which mold sections of the mold is moveable and, therefore, the molded article can withstand compression applied in that direction.

In the present invention, it is preferred that the molten resin 10 discharged from the accumulator 5 exhibit a low expansion speed. The kind of the melt index (MI) value of the resin, the kind and amount of the blowing agent, the kind and amount of the expansion aid (cell adjusting agent) and the shape and size of the cross-section of the die 7 of the accumulator 5 through which the resin is discharged have an influence upon the expansion speed. It is especially effective to select a die having such a size and a shape that can provide only a small difference in pressure between the atmosphere into which the molten resin is discharged therethrough and the inside of the accumulator from which the discharge of the molten resin has just been completed. It is also effective to minimize the amount of the expansion aid. For example, in the case of high density polyethylenes having an MI value of 0.5–20, the use of 5–20 parts by weight of dichlorotetrafluoroethane and/or dichlorodifluoromethane, or 0–0.05 part by weight of talc per 100 parts by weight of the polyethylene is recommended.

Before expansion-molding the molten resin discharged from the accumulator, the resin may be forcibly cooled for the formation of a skin layer over the surface thereof. The cooling may be effected by allowing the resin to pass through a pair of cooled rolls or by direct contact with cooled water or ice water. The resin having the skin layer is then heated for the softening of the skin layer before conducting the expansion-molding. This method is effective to produce expanded articles having a high mechanical strength.

The shape of the resin discharged from the accumulator is not restricted to a plate only. A lump without a specific shape, a rod or any other shaped body may be used.

Since there is available ample time until the expansion of the expandable molten resin placed into a mold cavity is completed, and since the environment into which the molten resin is discharged from the accumulator 5 can be under ambient pressure, the expansion molding can be performed in various manners. Examples of suitable molding methods will be described below with reference to FIGS. 2–4 in which the same reference numerals designate similar component parts.

In the embodiment illustrated in FIGS. 2(a) through 2(d), the resin discharged from the accumulator has a plate-like form. The resin 10 is fed between a lower, stationary and an upper, vertically moveable mold sections 12 and 13 (FIG. 2(a)). Then the mold sections 12 and 13 are closed (FIG. 2(b)). The mold is heated to permit the resin 10 within the mold cavity 14 defined between the mold sections 12 and 13 to expand. If desired, the mold cavity 14 is subjected to a reduced pressure by connecting a vacuum device (not shown) to evacuation ports 15 and 16 provided in the mold sections 12 and 13. The resin expands, inflates, and fills the mold cavity 14 (FIG. 2(c)). The mold 11 is then cooled and, thereafter, the upper mold section is displaced upward (FIG. 2(d)). The robes 18 are removed to give a molded article 17.

Another embodiment is shown in FIGS. 3(a)–3(d) in which the same mold as used in the above is employed. A predetermined quantity of the molten expandable resin 10 discharged from the accumulator is placed in the mold cavity 14 (FIG. 3(a)). After closure of the mold sections 12 and 13 (FIG. 3(b)), the expansion of the resin 10 is performed with heating and, if desired, reducing the pressure. After completion of the expansion (FIG. 3(c)), the mold 11 is cooled and opened (FIG. 3(d)) to obtain a molded article 17 which is free of such robes as formed in the case of the above-described embodiment.

FIGS. 4(a)-4(d) shows a further embodiment in which a stationary, male and a moveable, female mold sections 19 and 20 are used. The molten resin discharged from the accumulator is placed into the female mold section (FIG. 4(a)). Then, the female mold section 20 is moved upward to press the resin at a pressure of, for example, 1-10 kg/cm²G (FIG. 4(b)). This pressing treatment serves to improve the expansion ratio of the resin. The mold 11 is heated to accelerate the expansion of the pressed resin. As the expansion proceeds, the female mold section 20 is lowered to any desired level (FIG. 4(c)) by control of the pressure applied to the female mold section 20. During the course of the expansion, the pushing pressure of the female mold section 20 can be maintained at a constant value which may be the same as or lower than the pressure in the pressing step of FIG. 4(b), or can be gradually lowered in correspondence to the increase in the inflating pressure due to expansion of the resin. After completion of the expansion, the mold 11 is opened to recover the molded article 17 (FIG. 4(d)). In this embodiment, the ports 15 and 16 serve as vents.

For the purpose of the present specification, the expansion ratio of a foamed, molded article is defined as follows:

$$\text{Expansion Ratio} = \frac{\text{Bulk density of molded article}}{\text{Density of the resin prior to expansion}}$$

The degree of expansion of a molten mass of an expandable thermoplastic resin immediately before it is subjected to molding is obtained by the following manner: The molten resin is placed in a female mold section as shown in FIGS. 4(a)-4(d) and is pressed between the female and male mold sections while applying thereto a pressure of 1.5 kg/cm². The inside volume V of the mold defined between the mold sections when the female mold section stops moving is measured. The female mold section is then moved as the expansion of the resin proceeds. When the female mold section stops moving, the pressure applied to the resin in the mold is decreased to 0.5 kg/cm² to restart the expansion thereof. When the expansion is completed and the female mold section stops moving, the inside volume V' of the mold defined between the mold sections is measured. During the course of the molding operation, the temperature of the mold is maintained at a temperature higher by 10° C. than the melting point or softening point of the resin. The degree of expansion may be given by the following equation:

$$\text{Degree of Expansion (\%)} = \frac{dV - W}{dV' - W} \times 100$$

where d represents the density of the molten resin prior to expansion and W represents the weight of the molten resin placed in the mold.

The following examples will further illustrate the present invention.

Example

Foamed articles were prepared using the apparatus shown in FIGS. 1 and 4. Thus, the thermoplastic resin indicated in the Table below and the blowing agent shown in the Table were mixed by means of an extruder at a temperature of 160° C. and the resulting expandable resin composition was extruded at a rate of 10 kg/hr into an accumulator and accumulated therein at a temperature as shown in the Table. The amount of the blowing agent used was as indicated in the Table. The expandable resin accumulated in the accumulator was ejected through a die with an outlet cross-sectional area of 15 cm² at a rate of 300 kg/hr into the atmosphere. The ejected mass was immediately placed in the mold as shown in FIG. 4 and expansion molded to obtain a foamed, molded article having an expansion ratio as shown in the Table.

TABLE

|  | Test No. 1 | 2 | 3 | 4 |
|---|---|---|---|---|
| Thermaplastic resin |  |  |  |  |
| Kind | HDPE*1 | HDPE | PP*2 | HDPE |
| Density (g/cm³) | 0.965 | 0.963 | 0.90 | 0.963 |
| MI | 13.0 | 5.3 | 8.0 | 5.3 |
| Blowing Agent |  |  |  |  |
| Kind | DCTFE*3 | DCTFE | DCDFM*4 | Butane |
| Amount (mole/100 g-resin) | 0.092 | 0.096 | 0.074 | 0.153 |
| Temperature in accumulator (°C.) | 150 | 140 | 145 | 150 |
| Expansion ratio | 4.0 | 5.0 | 3.5 | 3.2 |

*1HDPE: High density polyethylene
*2PP: Polypropylene
*3DCTFE: Dichlorotetrafluoroethane
*4DCDFM: Dichlorodifluoromethane

What is claimed is:

1. A method of producing a foamed, molded article, comprising the steps of:
   (a) accumulating in an accumulator a molten mass of an expandable thermoplastic resin while maintaining said molten mass at a temperature and a pressure so that said molten mass is prevented from foaming;
   (b) ejecting a predetermined quantity of the accumulated thermoplastic resin rapidly from said accumulator, into an atmosphere maintained at a pressure lower than the pressure within said accumulator so that the ejected thermoplastic resin commences foaming;
   (c) placing the ejected, molten thermoplastic resin in a mold cavity before the expansion thereof has been completed, said cavity being defined by a mold having a male mold section and a female mold section movable relative to each other, said mold sections having complementary-shaped configurations defining the mold cavity, the volume of said cavity being changeable by changing the position of said mold sections relative to each other;
   (d) compressing the molten thermoplastic resin placed in the mold cavity by changing the position of said mold sections relative to each other to change the volume of said cavity, the molten thermoplastic resin being compressed between said mold sections before the completion of the expansion to improve the expansion ratio of the resin; and
   (e) completing the expansion and molding of the thermoplastic resin in the mold cavity while controlling the compression pressure by moving said mold sections relative to each other, thereby to obtain a foamed, molded article.

2. A method as claimed in claim 1, wherein said thermoplastic resin is a polyolefin resin.

3. A method as claimed in claim 2, wherein said polyolefin resin is a polypropylene resin or a high density polyethylene.

4. A method as claimed in claim 1, wherein said molten mass of the expandable thermoplastic resin is obtained by mixing the thermoplastic resin with a blowing agent at a temperature and a pressure so as to cause the resin to melt and to prevent the resin from foaming.

5. A method as claimed in claim 1, wherein the compressing of step (d) is at a pressure of 1–10 kg/cm² gage.

* * * * *